United States Patent [19]

Meyer

[11] 3,852,200

[45] Dec. 3, 1974

[54] DRILLING LIQUID CONTAINING MICROCRYSTALLINE CELLULOSE

[75] Inventor: W. Keith Meyer, Indiana Township, Pa.

[73] Assignee: Gulf Research & Development Company, Pittsburgh, Pa.

[22] Filed: Feb. 8, 1973

[21] Appl. No.: 330,567

[52] U.S. Cl. ............ 252/8.5 A, 51/303, 175/65, 252/8.5 B, 252/8.5 C
[51] Int. Cl. ............................................. C09k 3/14
[58] Field of Search ........... 252/8.5 A, 8.5 B, 8.5 C; 51/308, 295, 303; 175/65, 67

[56] References Cited
UNITED STATES PATENTS

| | | | |
|---|---|---|---|
| 3,311,553 | 3/1967 | Weiss et al. | 252/8.5 B |
| 3,508,621 | 4/1970 | Gaylord et al. | 252/8.5 A |
| 3,509,066 | 4/1970 | Jacobs et al. | 252/8.5 B |
| 3,583,911 | 6/1971 | Lang | 252/8.5 A |

Primary Examiner—Donald J. Arnold

[57] ABSTRACT

A drilling liquid for use in abrasive jet drilling is formed by first dispensing microcrystalline cellulose in an aqueous liquid. The dispersion can be accomplished by severe shearing of the microcrystalline cellulose in the aqueous liquid. Thereafter, ferrous abrasive particles are suspended in the dispersion of microcrystalline cellulose in water to form the drilling liquid. The microcrystalline cellulose is ordinarily in a concentration in the range of 4 to 7 percent by weight of the abrasives-free liquid, but a portion of the cellulose can be replaced with clay to form a liquid capable of suspending ferrous abrasive particles and thereby form a drilling liquid suitable for use in the abrasive jet drilling process.

5 Claims, 1 Drawing Figure

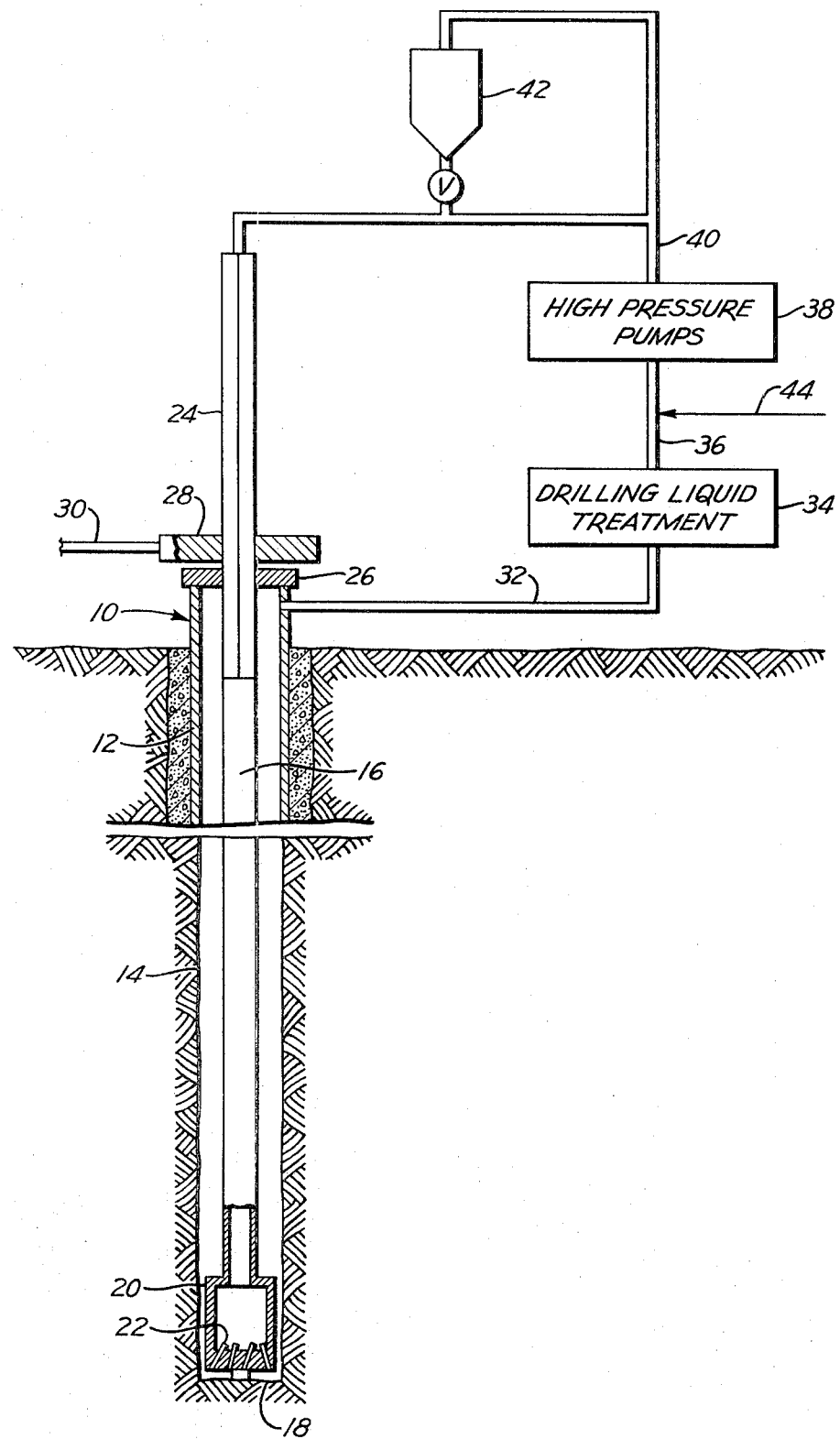

DRILLING LIQUID CONTAINING MICROCRYSTALLINE CELLULOSE

This invention relates to the drilling of wells and more particularly to a drilling fluid for use in an abrasive jet drilling process in which an abrasive-laden stream is discharged at a high velocity against the bottom of a borehole to penetrate the rock formation.

Most oil and gas wells are drilled by the rotary drilling process in which drilling mud is pumped down the well through a rotating drill pipe and discharged through nozzles in a bit mounted on the lower end of the drill pipe. The drill bits are provided with roller type cutters or with blades for breaking or cutting rock at the bottom of the borehole. The drilling mud discharged from the bit circulates up the borehole through the annulus between the drill string and borehole wall and is discharged from the well at the surface. The drilling mud serves two principal purposes in the conventional rotary drilling method in providing a hydrostatic pressure within the borehole that exceeds the pressure in formations penetrated by the borehole to prevent blowouts and in suspending the rock cuttings to facilitate their removal from the borehole. At the surface, the drilling mud is treated to condition it for reuse and is recirculated down the well.

A recently developed method of drilling which is of particular value in drilling hard formations is the abrasive jet drilling process. In that process, an abrasive-laden drilling liquid is pumped down the well through a drill string and discharged at extremely high velocities from nozzles in a drill bit mounted on the lower end of the drill string. The high velocity streams of drilling liquid erode the rock in the bottom of the borehole. The drilling liquid and rock cuttings are circulated up the well through the annulus and discharged from the well at the surface. Removal of rock cuttings and other treatment of the drilling liquid at the surface conditions the drilling liquid for recirculation through the well for further drilling.

The preferred abrasives for the abrasive jet drilling process are small particles of cast iron or steel. The particles may be angular grit particles or shot of substantially spherical shape. Because of the high density of cast iron and steel as compared with rock, it is substantially more difficult to suspend the abrasive particles in the drilling liquid than to suspend rock particles.

One method that is widely used to increase the ability of drilling mud to carry cuttings in conventional rotary drilling is to disperse clay in the drilling mud and thereby increase the viscosity and gelling properties of the drilling mud. Increasing the viscosity of drilling mud by the addition of clay sufficiently to suspend ferrous abrasive particles increases excessively the pressure drop of the drilling mud as it flows through the drill string. Since an important part of the total cost of the jet drilling process is the power required to pump the drilling liquid, suspensions of clay are not suitable drilling liquids for the jet drilling process.

In U.S. Pat. No. 3,508,621 of Gaylord and Meyer, a drilling liquid comprising a low concentration of clay solids and wood fibers suspended in water is described for use in the abrasive jet drilling process. The wood fibers are preferably fibers of soft woods and have a fiber length in the range of 3 to 5 millimeters; however, wood fibers having a length as short as 1 millimeter are described as usable. Such fibers are not self-suspending in water; therefore, clay is incorporated in the drilling liquid to suspend the relatively long wood fibers. The clay-wood fiber suspension is able to suspend ferrous abrasive particles to prevent their settling out in the well when circulation is stopped and also results in a substantially lower pressure drop in the drill string than clay-based muds when pumped at the rates required to give the desired velocity of the jet streams discharged from the bit. The presence of the wood fibers, however, interferes with the treatment of the drilling liquid at the surface to condition it for recirculation in the well. Ordinarily, the drilling liquid discharged from the well is passed over a vibrating screen, referred to as a shale shaker, to separate the large cuttings from the abrasive particles in the liquid phase of the drill. The wood fibers tend to clog the screen and have made it necessary to use screens of approximately 12 mesh in the shale shaker to keep the screen from clogging. Since the preferred size of abrasive particles used in jet drilling is in the range of 20 – 60 mesh, a 12 mesh shale shaker leaves in the drilling mud rock cuttings having a size substantially larger than the size of the abrasive particles.

This invention resides in a drilling liquid for use in the abrasive jet drilling process in which microcrystalline cellulose in the form of mechanically broken fragments of crystallites of level-off DP cellulose are dispersed in water to form a dispersion capable of suspending ferrous abrasive particles and having a viscosity allowing circulation without excessive pressure drop of the drilling liquid through the well and discharge from nozzles in the drill bit at a velocity exceeding 650 feet per second. Clay can be added in lieu of a part of the microcrystalline cellulose to reduce the cost of the drilling liquid. The drilling liquid may contain additives used in conventional drilling muds to impart desired properties to the drilling liquid. For example, if a high density drilling liquid is required to counteract expected high formation pressures, weighting agents such as barite can be added to the drilling liquid. Similarly, the water loss of the drilling liquid can be reduced by the addition of sodium carboxymethyl cellulose or starch; however great care must be used in adding those compounds to avoid excessive viscosity and gel strength. Bactericides can be incorporated in the drilling liquid to inhibit fermentation of organic compounds such as starch in the drilling liquid. Additives suitable for use in the drilling liquid are limited by the requirement that the additive be capable of retaining its properties when subjected to the extreme shear that occurs in drill bit nozzles.

The single FIGURE of the drawing is a diagrammatic view partially in vertical section of a well with drilling apparatus for using the drilling liquid of this invention.

The fragmented crystallites suspended in water in the preparation of the drilling liquid of this invention are microcrystalline cellulose ranging in diameter from about 0.15 to 10.0 microns, with most of the particles having a diameter less than 1 micron, and ranging in length from 10 to 200 microns. The microcrystalline aggregates are prepared by the hydrolysis of cellulose to a level-off degree of polymerization (DP) in the range of 40 to 300 followed by shearing. The preparation of level-off DP cellulose is described in the paper by O. A. Battista entitled "Hydrolysis and Crystallization of Cellulose" published in Industrial and Engineering Chemistry, Volume 42, No. 3, March, 1960, at pages 502 through 507. A preferred method of preparing level-off DP cellulose is by drastic hydrolysis resulting from subjecting cellulose to 2 ½ normal solution of hydrochloric acid at a temperature of about 105°C for 15 minutes. The level-off DP cellulose is washed and neutralized and thereafter subjected, while in an aqueous suspension, to severe shearing such as occurs by vigorous mixing in a Waring Blendor for a period of one hour. The preparation of the microcrystalline cellulose is described and claimed in U.S. Pat. No. 3,141,875 entitled "Crystallized Aggregates Disintegrated in Acid Medium," of O. A. Battista and Patricia A. Smith. A further description of the microcrystalline cellulose is in the paper "Microcrystalline Cellulose" published in Industrial and Engineering Chemistry, Volume 54, No. 9, September, 1962, at pages 20 through 29.

The microcrystalline cellulose is dispersed in water in a concentration in the range of from 4 percent to approximately 7 percent by weight to provide a fluid that will suspend the ferrous abrasive particles in the abrasive jet drilling process. It is important in the preparation of the drilling fluid to shear the microcrystalline cellulose severely to produce a dispersion having the desired abrasive supporting characteristics. The desired shearing can be accomplished by adding the microcrystalline cellulose to water and discharging the mixture at a high velocity through nozzles into a mixing tank. The velocity of discharge into the mixing tank of the suspension of the microcrystalline cellulose in water is such that a pressure drop of the order of 2,000 psi occurs in the nozzle. Ferrous abrasive particles can then be mixed with the resultant suspension and delivered to pumps for circulating in the well. Another and preferred method of preparing the drilling fluid of this invention is to mix microcrystalline cellulose with water in the desired concentration and circulate the mixture several times through the drilling system. The high pressure drop of 5,000 psi to 10,000 psi that occurs in the nozzle of the drill bit provides the shearing necessary for suspension of the microcrystalline cellulose in the water. After the suspension of microcrystalline cellulose in water has been circulated through the drill bit several times, ferrous abrasive particles are added to the suspension to prepare the drilling liquid useful in the abrasive jet drilling process.

Concentrations of microcrystalline cellulose less than 4 percent do not have adequate gel strength to suspend the ferrous abrasive particles when circulation in the well is stopped. Concentrations higher than 7 percent have too high a viscosity which results in excessive pressure drop in the drill pipe and consequently in excessive power costs for pumping the drilling liquid.

Clay can be substituted for a portion of the microcrystalline cellulose in the drilling liquid and is advantageous in reducing the cost of drilling liquid. For example, the total of the clay and cellulose content of the suspension may be in the range from 6 to 7 percent of the suspension with the clay constituting up to ½ of the total of clay and microcrystalline in the drilling liquid, and not exceeding a concentration of about 3 percent, by weight, of the drilling liquid. It is preferred that the clay be an attapulgite type clay rather than a bentonitic clay because of the greater resistance to contamination of the attapulgite type clays.

Some of the laboratory tests conventionally conducted on drilling muds used in conventional rotary drilling operations can be used to determine whether or not the drilling liquids can be used in the abrasive jet drilling process. It is essential that the drilling liquid be capable of suspending ferrous abrasive particles when circulation of drilling liquid is stopped. A gel strength of 30 or higher, as determined with a Fann Viscometer, is adequate to suspend the abrasives. The gel strength should not exceed 70, and preferably should not exceed 60, to avoid excessive pressures when circulation is started after circulation has been stopped for a while. The high pressures for commencing circulation when the gel strengths are high may cause fracturing of formations at the bottom of the hole.

The viscosity as measured at 600 RPM on the Fann Viscometer provides a measure of the pressure drop required to circulate the drilling liquid through the well, including the drill bit, at the high rate required for abrasive jet drilling. A Fann viscosity at 600 RPM of 120 has been considered to be the limit that can be used without excessive pressure drop and pumping costs. Drilling can be conducted with drilling liquids having a Fann 600 RPM viscosity exceeding 120 but the power costs for pumping the drilling liquid increase rapidly with no compensating benefits at the higher viscosities.

Samples of drilling liquid were prepared by vigorous mixing of water with microcrystalline cellulose or microcrystalline cellulose and Zeogel, an attapulgite clay. The 600 RPM viscosity and gel strengths of the drilling liquid were measured on a Fann Viscometer. The results of the measurements are set forth in the following table.

| Composition of Drilling Liquid | No. Times Sheared | Fann Reading 600 RPM | Gel Strength 10 Sec. | Gel Strength 10 Min. | pH |
|---|---|---|---|---|---|
| 1. 4% MC | | 61 | 23 | 17 | |
| 2. 4% MC | 40 | 81 | 27 | 29 | 8.1 |
| 3. 5% MC | 50 | 106 | 45 | 55 | 8.0 |
| 4. 6% MC | | 89 | 42 | 40 | 7.3 |
| 5. 2% Zeogel,4%MC | | 86 | 39 | | 7.5 |
| 6. 2% Zeogel,4%MC | | 82 | 39 | | 7.5 |
| 7. 2% Zeogel,4%MC | | 79 | 37 | | 9.5 |
| 8. 2% Zeogel,4%MC | | 78 | 37 | | 9.9 |
| 9. 2% Zeogel,4%MC | | 79 | 37 | | 10.6 |
| 10. 3% Zeogel,4%MC | | 111 | 56 | | 8.1 |
| 11. 2% Zeogel,5%MC | 10 | 96 | 49 | | 7.5 |
| 12. 2% Zeogel,5%MC | 25 | 103 | 52 | 42 | 8.0 |
| 13. 2% Zeogel,5%MC, 0.06% CMC (HV) | 45 | 105 | 65 | 93 | 8.0 |
| 14. 2% Zeogel,5%MC, 0.12% CMC (HV) | 55 | 75 | 73 | 173 | 8.0 |
| 15. 2% Zeogel,4%MC, 1/2% CMC | 85 | 75 | 41 | 172 | 8.2 |
| 16. 1% Zeogel,4%MC | | 69 | 28 | | |
| 17. 2% Zeogel,3%MC | | 62 | 24 | | |

The term "MC" under the composition of the drilling liquid refers to microcrystalline cellulose. The percentages are percent by weight in a suspension in water. In all samples where the space under "No. Times Sheared" is blank, the sample was prepared by mixing in a Waring Blendor.

As shown by sample 1, an aqueous dispersion containing 4 percent microcrystalline cellulose prepared by mixing in a Waring Blendor has a gel strength insufficient to suspend ferrous abrasive particles. If the 4 percent suspension of microcrystalline cellulose were sheared by passing through nozzles at a pressure drop of approximately 4,000 psi 40 times, the increased dispersion of the cellulose increases the gel strength to 27, which is on the border line of acceptability. An increase in the microcrystalline cellulose concentration to 5 percent increases the gel strength to well above the minimum required for suspension of ferrous abrasives and increases the viscosity to near the upper limit.

The addition of 2 percent Zeogel, an attapulgite clay marketed by Baroid Division of National Lead, increases both the gel strength and viscosity of the suspension. The difference between sample 5 and 6 is in the time that the sample was mixed in the Waring Blendor. Sample 6 was mixed in a Waring Blendor for one hour more than sample 5. A comparison of samples 6 through 9 shows that the suspension is little affected by an increase in pH up to the level of 10.6.

A comparison of samples 1, 5, 10, and 16 shows the effect of adding Zeogel to the 4 percent microcrystalline cellulose suspension. Samples 13, 14, and 15 illustrate the strong gelling effect of sodium carboxymethyl cellulose (CMC) on suspensions of Zeogel and microcrystalline cellulose.

Referring to the drawing, a well indicated generally by reference numeral 10 is illustrated with casing 12 set in the upper end of the well and with open hole 14 at the lower end of the well. Drill pipe 16 extends downwardly through the well substantially to the bottom 18 of the borehole. A drill bit 20 having a plurality of nozzles 22 opening through its lower end is connected to the lower end of the drill pipe 16.

A kelly 24 connected to the upper end of drill pipe 16 extends through a suitable closure 26 and rotary table 28. Power is supplied to the rotary table 28 through a suitable shaft 30 to rotate the drill pipe 16 and, thereby, the drill bit 20 secured to the lower end of the drill pipe 16.

Opening from the casing 12 below closure 26 is a discharge line 32 extending to apparatus 34 indicated generally by the legend "Drilling Liquid Treatment." Ordinarily, the treatment consists of removing from the drilling liquid large-size cuttings by a shale shaker and very fine particles by cyclone separators, and cooling the liquid before passing it to the high-pressure pumps. A treated mud line 36 from the drilling liquid treatment apparatus 34 delivers treated drilling liquid to high pressure pumps 38 which recirculate the drilling liquid through an injection line 40 to the upper end of the kelly 24. A pressure transfer case 42 may be provided for injecting the abrasive into the high pressure drilling liquid delivered to the upper end of kelly 24; however, abrasives and other mud chemicals may be added ahead of pumps through a line 44. Usually, the mud treatment system will include a mixing tank provided with suitable agitation equipment to facilitate mixing of chemicals added to maintain the desired drilling liquid characteristics.

When commencing drilling with the jet drilling liquid of this invention, an aqueous suspension of microcrystalline and clay solids is delivered by high pressure pumps through injection line 40 into the upper end of kelly 24. The drilling liquid passes from kelly 24 downwardly through drill pipe 16 into the drill bit 20 from which the drilling liquid is discharged through nozzles 22. At the high flow rate of the drilling liquid provided by high pressure pumps 38 there is a pressure drop across nozzles 22 of at least 4,000 and preferably exceeding 5,000 psi.

Drilling liquid discharged through discharge line 32 is delivered to apparatus 34 in which the drilling liquid is treated before it is recirculated in the well. After one or two circulations of a freshly prepared aqueous suspension of microcrystalline cellulose through the system, the ferrous abrasive particles are added to the suspension to form the desired drilling liquid. The abrasive-laden liquid under a high pressure then flows through the drill pipe and is discharged through the nozzles 22 to cut the bottom of the borehole. Clay solids, microcrystalline cellulose, ferrous abrasives, fluid-loss additives, bacterial inhibitor, other additives, and water are added to the system as required to maintain the desired volume of drilling mud of the desired composition and characteristics.

In the hydraulic jet drilling method, it is essential that the abrasive-laden drilling liquid be discharged from the drill bit at a velocity exceeding 650 feet per second against the bottom of the borehole. In a preferred method, a plurality of jet streams cut a plurality of concentric grooves in the bottom of the borehole as the jet bit 20 is rotated. Ridges between the grooves are mechanically broken by the bit as it rotates. Because of the extremely high velocity at which the drilling liquid is discharged from the drill bit and the necessity of a large number of jet streams, usually 10 to 20, to cut concentric grooves at intervals across the full diameter of the bottom of the borehole, the volume and velocity of the drilling liquid in the drill pipe and annulus is high. Unless the drilling liquid has a unique combination of strong solids suspension characteristics and low pressure drop, it cannot be used effectively in hydraulic jet drilling with ferrous abrasives. Clay alone, in an aqueous suspension having a viscosity and gel strength adequate to suspend ferrous abrasives, causes an excessive pressure drop in the drill pipe and annulus.

The drilling liquids of this invention comprise a dispersion in water of microcrystalline cellulose in a concentration adequate to suspend ferrous abrasive particles which may be either steel or cast iron grit or shot. It is preferred that the abrasive particles have a size in the range of about 20 to 60 mesh in the U.S. Sieve Series; however, the size used will depend in part on the diameter of the nozzle in the jet drill bit. 20 – 60 mesh particles are preffered for use in drill bits equipped with nozzles having a diameter of ⅛ inch. If drill bits equipped with nozzles of smaller diameter are used, it may be desirable to use smaller abrasive particles to prevent the particles from plugging the nozzle. The abrasives are dispersed in the water in a concentration preferably in the range of about 2 to 8 percent by bulk volume. Higher concentrations of ferrous abrasives, for example, in the range from 8 percent to as high as 20 percent, are sometimes employed to increase the density of the drilling liquid as required to counteract abnormal formation pressures.

The drilling liquid of this invention has the important advantage over drilling liquids heretofore available for use in abrasive jet drilling of facilitating surface treatment of the drilling liquid to condition it for recirculating through the well. Whereas the long fiber drilling liquids permitted only the use of a shale shaker having mesh sizes of 12 or larger, the drilling liquid of this invention will pass through a 200 mesh screen. Additionally, cyclone separators used to separate fine particles of cuttings from the drilling liquid operate much more efficiently on the drilling liquid of this invention than on the long fiber drilling liquid.

When the drilling liquid of this invention is substantially free of added clay, the reconditioning of the drilling liquid is further facilitated by the elimination of the necessity of separating formation cuttings from clay. Moreover, when clay is incorporated in the drilling liquid it is usually desirable to add a thinner or dispersant such as Q-broxin, a commercially available ferrochrome lignosulfonate. Such dispersants have a tendency to disperse cuttings as well as clay and thereby make more difficult separation of cuttings from the drilling liquid. Since the abrasive jet drilling process is of principal value in drilling hard formations which most frequently occur in deep formations which are at a high temperature, it is advantageous to use the suspension of microcrystalline cellulose devoid of clay to avoid the effects of high temperature on suspensions of clay.

The dispersion of microcrystalline cellulose is not adversely affected by contamination with salts most likely to be encountered in drilling. Incorporation of sodium chloride, calcium salts and hydroxide and iron salts in aqueous dispersions of microcrystalline did not adversely affect the characteristics of the dispersions listed in the above table. An important advantage, therefore, of the drilling liquids is their resistance to contamination.

I claim:

1. A drilling liquid for abrasive jet drilling of wells comprising water, microcrystalline cellulose dispersed in the water in a concentration of about 4 to 7 percent by weight of the water, and ferrous abrasive particles suspended in the dispersion in a concentration of 4 to 20 percent, by bulk volume, of the dispersion, said microcrystalline cellulose having a level-off degree of polymerization in the range of 40 to 300.

2. A drilling liquid as set forth in claim 1 in which the microcrystalline cellulose comprises mechanically fragmented crystallites of cellulose that has been acid hydrolyzed to a level-off degree of polymerization in the range of 40 to 300.

3. A drilling liquid as set forth in claim 2 in which the microcrystalline cellulose particles have a diameter in the range of 0.15 to 10.0 microns, with the diameter of most of the particles being less than 1 micron, and have a length in the range of 10 to 200 microns.

4. A drilling liquid as set forth in claim 1 in which the 10 second gel strength as measured on the Fann Viscosimeter is in the range of 30 to 70 and the 600 RPM Viscosity as measured on the Fann Viscosimeter is less than 120.

5. A drilling liquid as set forth in claim 4 including attapulgite clay suspended in the drilling liquid in a concentration by weight on an abrasives-free basis in the range of 1 to 3 percent, and the microcrystalline cellulose is in a concentration by weight of 4 to 6 percent of the water.

* * * * *